(12) United States Patent
Takemoto

(10) Patent No.: US 8,925,895 B2
(45) Date of Patent: Jan. 6, 2015

(54) CUTOFF VALVE CONTROL APPARATUS

(75) Inventor: Yoshinori Takemoto, Tokyo (JP)

(73) Assignee: Kaneko Sangyo Co., Ltd., Tokyo (JP)

( * ) Notice: Subject to any disclaimer, the term of this patent is extended or adjusted under 35 U.S.C. 154(b) by 650 days.

(21) Appl. No.: 12/959,786

(22) Filed: Dec. 3, 2010

(65) Prior Publication Data

US 2012/0048396 A1    Mar. 1, 2012

(30) Foreign Application Priority Data

Aug. 31, 2010    (CN) .......................... 2010 1 0267962

(51) Int. Cl.
| | |
|---|---|
| F16K 31/42 | (2006.01) |
| F16K 37/00 | (2006.01) |
| F16K 31/163 | (2006.01) |
| F16K 5/06 | (2006.01) |
| F15B 19/00 | (2006.01) |

(52) U.S. Cl.
CPC ....... *F15B 19/005* (2013.01); *F15B 2211/3057* (2013.01); *F16K 37/0083* (2013.01); *F16K 37/0091* (2013.01); *F16K 31/1635* (2013.01); *F16K 5/0647* (2013.01); *F15B 2211/7054* (2013.01)
USPC ........ 251/129.04; 251/31; 251/63.4; 137/554

(58) Field of Classification Search
USPC .......... 251/25, 31, 62, 63.4, 129.04; 137/554; 91/1, 489
See application file for complete search history.

(56) References Cited

U.S. PATENT DOCUMENTS

| | | | |
|---|---|---|---|
| 4,523,286 A | * | 6/1985 | Koga et al. .................... 702/183 |
| 6,073,650 A | | 6/2000 | Garrigues et al. |
| 6,131,609 A | * | 10/2000 | Metso et al. ................... 137/552 |
| 8,342,478 B1 | * | 1/2013 | Cordray et al. .......... 251/129.03 |
| 2005/0247351 A1 | | 11/2005 | Kubota et al. |

FOREIGN PATENT DOCUMENTS

| | | |
|---|---|---|
| CN | 1918524 | 2/2007 |
| DE | 102004006354 | * 8/2005 |
| JP | 2009092110 | * 4/2009 |

OTHER PUBLICATIONS

Extended European Search Report mailed Jan. 20, 2013 in counterpart application No. 10193247.3.
Notification of the First Office Action mailed Dec. 31, 2012 from the State Intellectual Property Office of the P.R. China in counterpart application No. 201010267962.5.
Korean Office Action issued in corresponding application No. 10-2010-0137920 dated May 9, 2012 with English translation (6 pages).

\* cited by examiner

*Primary Examiner* — John K Fristoe, Jr.
*Assistant Examiner* — Jonathan Waddy
(74) *Attorney, Agent, or Firm* — Kratz, Quintos & Hanson, LLP

(57) ABSTRACT

The present invention provides a cutoff valve control apparatus capable of predicting a failure of devices therein with a failure diagnosis based on an operation test when the cutoff valve control apparatus is set. The cutoff valve control apparatus includes a judging device to judge a normal state or an abnormal state of the apparatus based on a pressure characteristic of an internal pressure of a cylinder measured with a pressure sensor when an air is supplied to the cylinder of an air cylinder from an air supply source, and a memory device storing beforehand the pressure characteristic of the internal pressure of the cylinder of an initial normal operation of the apparatus and the pressure characteristic of a failure prediction boundary. The judging device judges (1) the apparatus the normal state when the measured pressure characteristic is in a area between the pressure characteristic of the normal operation and the pressure characteristic of the failure prediction boundary, and (2) the apparatus the abnormal state when the measured pressure characteristic is outside the area between the pressure characteristic of the normal operation and the pressure characteristic of the failure prediction boundary.

6 Claims, 8 Drawing Sheets

CUTOFF VALVE CONTROL APPARATUS

BACKGROUND OF THE INVENTION

1. Field of the Invention

The present invention relates to a cutoff valve control apparatus.

2. Description of the Related Art

A pipeline of oil or gas of a plant facility includes a cutoff valve such as ball valve to rapidly cutoff the pipeline when the facility is in an abnormal state. The cutoff valve is maintained once one year with a full stroke operation test (from a full open state to a full close state) after the cutoff valve is installed in the plant facility in order to inspect presence of a failure.

The full close state of the cutoff valve causes a shutdown of the plant facility and prevents a routine operation. The test operation of the cutoff valve is thus not carried out during the routine operation. The applicant of the present invention developed a cutoff valve control apparatus capable of diagnosing and predicting the presence of the failure of the apparatus during the routine operation without shutdown of the plant facility (JP 2009-092110 A).

A failure diagnosis of the installed cutoff valve control apparatus is already developed. When an emergency cutoff valve is installed in the pipeline of the plant facility, it is required to achieve the failure diagnosis of the cutoff valve.

A variety of setting of the cutoff valve control apparatus including such as the cutoff valve and the control device is achieved when the cutoff valve control apparatus is installed in the pipeline of the plant facility. It is necessary to diagnose presence of the failure of the respective devices of the cutoff valve control apparatus at the test operation when the apparatus is installed.

SUMMARY OF THE INVENTION

An object of the present invention is to provide a cutoff valve control apparatus allowing a diagnosis and a prediction of a failure of the associated devices of the cutoff valve control apparatus when the apparatus is installed and test operated.

According to a first aspect of the present invention, a cutoff valve control apparatus includes a cutoff valve; a control device including an air cylinder for controlling rotation of a valve axle of the cutoff valve and a solenoid valve for supplying an air from an air supply source to a cylinder of the air cylinder and exhausting the air from the cylinder of the air cylinder to control degree of opening of the cutoff valve; a pressure sensor for detecting an internal pressure of the cylinder; a judging device for judging a normal state or an abnormal state of the cutoff valve control apparatus based on a pressure characteristic of the internal pressure of the cylinder measured with the pressure sensor when the air from the air supply source is supplied to the cylinder of the air cylinder with control of the control device; and a memory device for beforehand storing the pressure characteristic of the internal pressure of the cylinder of an initial normal operation of the cutoff valve control apparatus and the pressure characteristic of a failure prediction boundary, wherein the judging device judges (1) the cutoff valve control apparatus the normal state when the measured pressure characteristic is in a area between the pressure characteristic of the normal operation and the pressure characteristic of the failure prediction boundary, and (2) the cutoff valve control apparatus the abnormal state when the measured pressure characteristic is outside the area between the pressure characteristic of the normal operation and the pressure characteristic of the failure prediction boundary.

Thereby, the test operation of the cutoff valve control apparatus installed in the pipeline of the plant facility judges the failure and the abnormal state of the apparatus.

Preferably, the judging device judges (1) the solenoid valve the normal state or the abnormal state based on the pressure characteristic measured from an energizing or a de-energizing time of the solenoid to a operation starting time of the air cylinder, (2) the air cylinder the normal state or the abnormal state based on the pressure characteristic from the operation starting time of the air cylinder to an operation starting time of the cutoff valve, and (3) the cutoff valve the normal state or the abnormal state based on the pressure characteristic measured after the operation starting time of the cutoff valve.

Thereby, the respective devices such as the solenoid valve, the air cylinder and the cutoff valve of the apparatus can be judged about the normal state or the abnormal state.

Preferably, the judging device judges the cutoff valve the normal state and the air cylinder the abnormal state when the pressure characteristic measured after the operation starting time of the cutoff valve is outside the area between the pressure characteristic of the normal operation and the pressure characteristic of the failure prediction boundary, and has a gradient same as that of the pressure characteristic of the normal operation measured after the operation starting time of the cutoff valve.

Thereby, the normal state of the cutoff valve and the abnormal state of the air cylinder of the cutoff valve control apparatus are judged.

According to a second aspect of the present invention, a cutoff valve control apparatus includes a cutoff valve; a control device including an air cylinder for controlling rotation of a valve axle of the cutoff valve and a solenoid valve for supplying an air from an air supply source to a cylinder of the air cylinder and exhausting the air from the cylinder of the air cylinder to control degree of opening of the cutoff valve; a pressure sensor for detecting an internal pressure of the cylinder; a judging device for judging a normal state or an abnormal state of the cutoff valve control apparatus based on a pressure characteristic of the internal pressure of the cylinder measured with the pressure sensor when the air from the air supply source is supplied to the cylinder of the air cylinder with control of the control device; a memory device for beforehand storing the pressure characteristic of the internal pressure of the cylinder of an initial normal operation of the cutoff valve control apparatus and a pressure characteristic of a failure prediction boundary; and a display device, wherein the judging device judges (1) the cutoff valve control apparatus the normal state when the measured pressure characteristic is in a area between the pressure characteristic of the normal operation and the pressure characteristic of the failure prediction boundary, and (2) the cutoff valve control apparatus the abnormal state when the measured pressure characteristic is outside the area between the pressure characteristic of the normal operation and the pressure characteristic of the failure prediction boundary, and wherein the display device displays the measured pressure characteristic, the pressure characteristic of the initial normal operation and the pressure characteristic of the failure prediction boundary stored in the memory device of the cutoff valve control apparatus.

Thereby, the display device visually shows the position of the measured pressure characteristic with respect to the normal operation area and the dangerous operation area to predict the failure in detail.

According to a third aspect of the present invention, a cutoff valve control apparatus includes a cutoff valve; a control device including an air cylinder for controlling rotation of a valve axle of the cutoff valve and a solenoid valve for supplying an air from an air supply source to a cylinder of the air cylinder and exhausting the air from the cylinder of the air cylinder to control degree of opening of the cutoff valve; a displacement detection device for detecting a displacement of a valve axle of the cutoff valve; a judging device for judging a normal state or an abnormal state of the cutoff valve control apparatus based on a displacement characteristic detected with the displacement detection device when the air from the air supply source is supplied to the cylinder of the air cylinder with control of the control device; a memory device for beforehand storing the displacement characteristic of an initial normal operation and the displacement characteristic of a failure prediction boundary of the cutoff valve control apparatus, wherein the judging device judges (1) the cutoff valve control apparatus the normal state when the measured displacement characteristic is in a area between the displacement characteristic of the normal operation and the displacement characteristic of the failure prediction boundary, and (2) the cutoff valve control apparatus the abnormal state when the measured displacement characteristic is outside the area between the displacement characteristic of the normal operation and the displacement characteristic of the failure prediction boundary.

Thereby, the failure and/or the abnormal state of the cutoff valve control apparatus are judged.

According to a fourth aspect of the present invention, a cutoff valve control apparatus includes a cutoff valve; a control device including an air cylinder for controlling rotation of a valve axle of the cutoff valve and a solenoid valve for supplying an air from an air supply source to a cylinder of the air cylinder and exhausting the air from the cylinder of the air cylinder to control degree of opening of the cutoff valve; a displacement detection device for detecting a displacement of a valve axle of the cutoff valve; a judging device for judging a normal state or an abnormal state of the cutoff valve control apparatus based on a displacement characteristic detected with the displacement detection device when the air from the air supply source is supplied to the cylinder of the air cylinder with control of the control device; a memory device for beforehand storing the displacement characteristic of an initial normal operation and the displacement characteristic of a failure prediction boundary of the cutoff valve control apparatus; and a display device, wherein the judging device judges (1) the cutoff valve control apparatus the normal state when the measured displacement characteristic is in a area between the displacement characteristic of the normal operation and the displacement characteristic of the failure prediction boundary, and (2) the cutoff valve control apparatus the abnormal state when the measured displacement characteristic is outside the area between the displacement characteristic of the normal operation and the displacement characteristic of the failure prediction boundary, and wherein the display device displays the measured displacement characteristic, the displacement characteristic of the initial normal operation and the displacement characteristic of the failure prediction boundary stored in the memory device of the cutoff valve control apparatus.

Thereby, the failure of the cutoff valve control apparatus is predicted.

DETAILED DESCRIPTION OF THE PREFERRED EMBODIMENTS

Figure 1A:
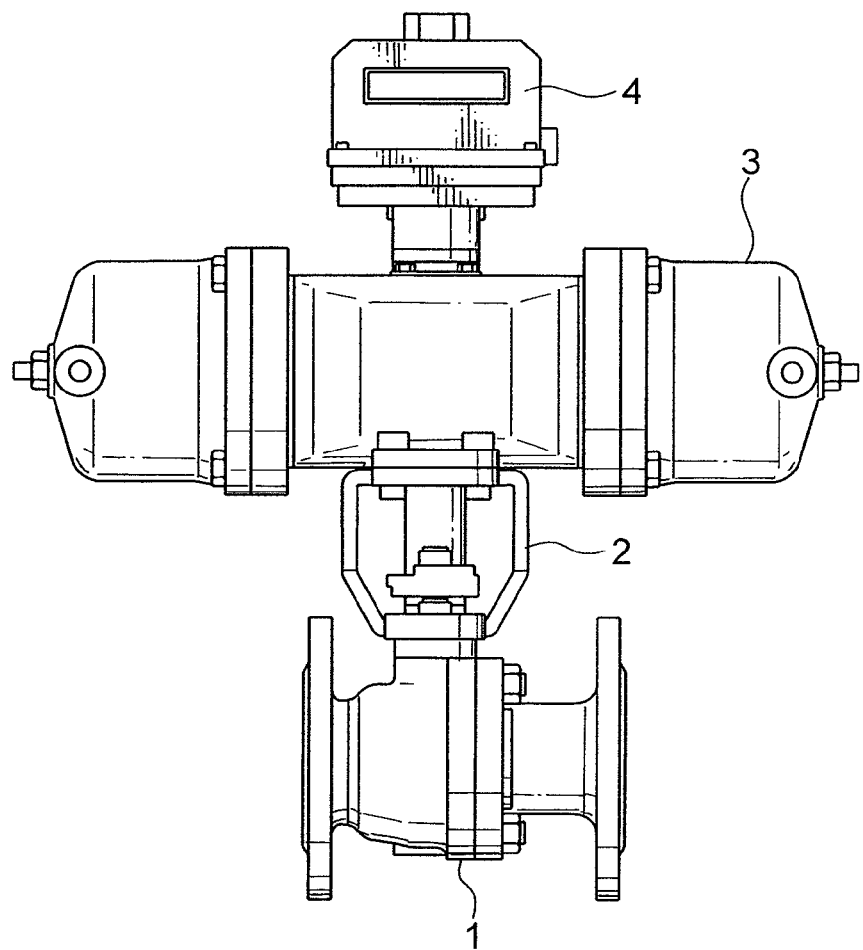
FIG. 1A is a front view of one embodiment of a cutoff valve control apparatus of the present invention.
Figure 1B:
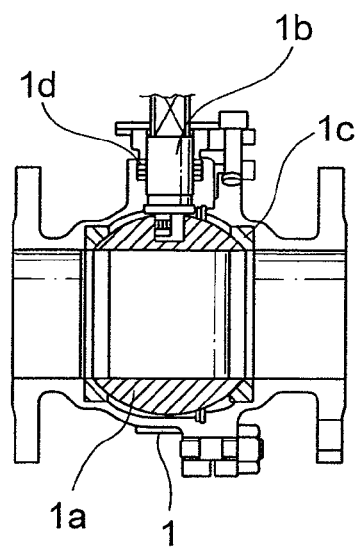
FIG. 1B is a partial sectional view of the cutoff valve control apparatus.

FIG. 1A and FIG. 1B show a front view and a partial sectional view of a cutoff valve control apparatus of the present invention. The cutoff valve control apparatus includes a cutoff valve 1, an air cylinder 3 connected to the cutoff valve 1 with a stationary yoke 2 and to control a degree of opening of the cutoff valve 1, and a positioning box 4 disposed on an upper portion of the air cylinder 3 and being outdoor or explosion-proof. The positioning box 4 includes a solenoid valve 5, a pressure sensor (electronic digital manometer) 6, a microcomputer 7, a potentiometer 8, a power supply 10, a display device 12 and other devices. The air cylinder 3 and the solenoid coil 5 are operable as a control device. The microcomputer 7 is operable as a judging device and a memory device. The potentiometer 8 is operable as a displacement detection device.

The cutoff valve 1 is a ball valve having a ball-shaped valve body 1a and connected to a pipeline of a plant facility. The valve body 1a is connected to a valve axle 1b extending upwardly from the valve body 1a. The valve body 1a has a full open state (FIG. 1B) or a full close state (not shown) for the pipeline with rotation of 90 degrees of the valve axle 1b. A periphery of the valve body 1a is sealed with a sheet seal 1c and a periphery of the valve axle 1b is sealed with a ground seal 1d.

Figure 2:
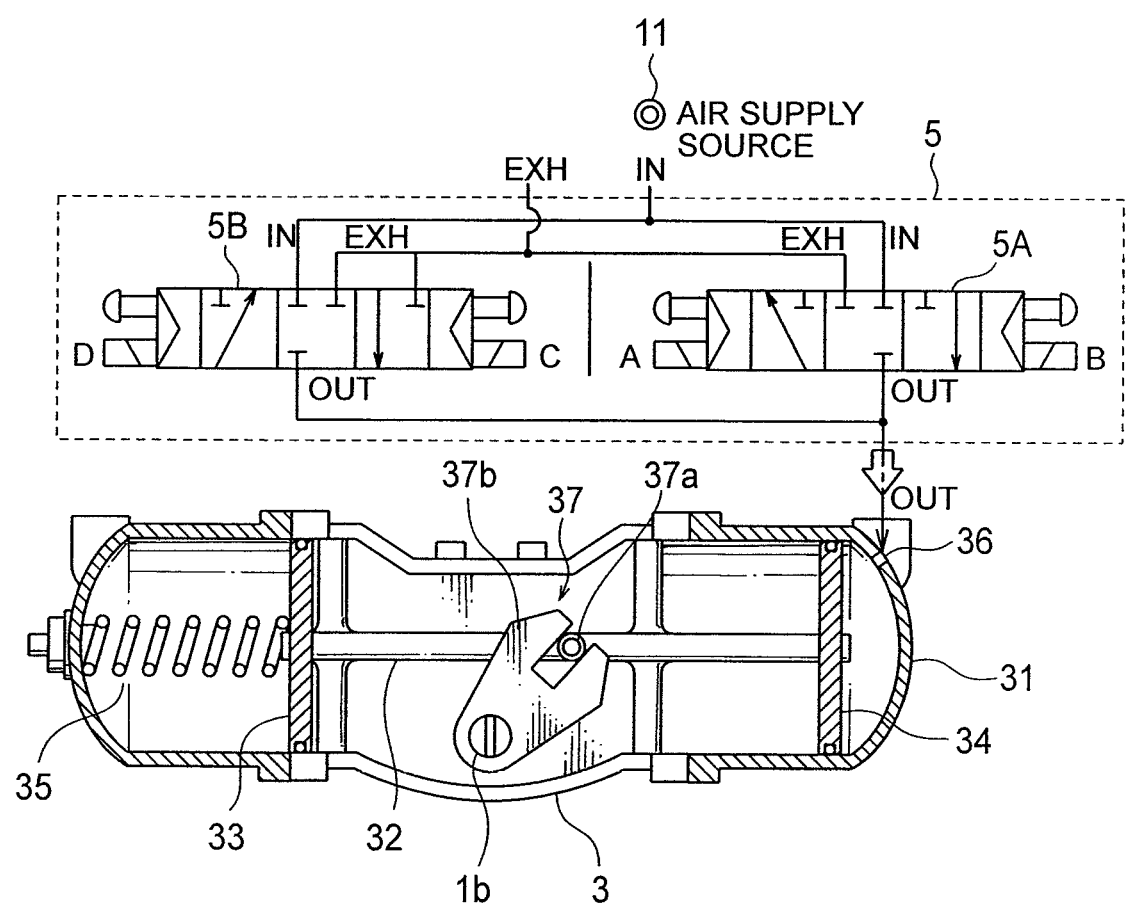
FIG. 2 is a configuration showing an air cylinder and a solenoid valve of the one embodiment of the cutoff valve control apparatus of the present invention.

Referring to FIG. 2, the air cylinder 3 includes a pair of pistons 33, 34 connected with a piston rod 32 received in a cylinder 31 and is an air type single operation. One piston 33 is always slidably urged with a force of a coil spring 35, which is disposed on one end portion of the cylinder 31, toward the right in FIG. 2 to close the cutoff valve 1. The other piston 34 is slidably urged against the force of the coil spring 35 with an air supplied from an outlet port OUT of the solenoid 5, which is connected to an air inlet opening 36 disposed on the other end portion of the cylinder 31, toward the left in FIG. 2 to open the cutoff valve 1. The piston rod 32 has a transmission portion 37 to transform reciprocal movement of the piston rod 32 to rotation movement of the valve axle 1b. The transmission portion 37 has an engagement pin 37a projecting from the piton rod 32 and a fork-shaped engagement segment 37b attached to an upper portion of the valve axle 1b. The end portion of the fork-shaped engagement segment 37b engages the engagement pin 37a so that the right and left movement of the engagement pin 37a causes pivotal rotation of the fork-shaped engagement segment 37b and thereby rotates the valve axle 1b by 90 degrees.

The solenoid valve 5 includes a large flow three-way solenoid valve 5A and a small flow three-way solenoid valve 5B therein. The large flow three-way solenoid valve 5A has solenoids A and B for switching the cutoff valve 1, and a large effective sectional area. When an abnormal state occurs in the pipeline, the large flow three-way solenoid valve 5A drives the air cylinder 3 to rapidly close the cutoff valve 1. The large flow three-way solenoid valve 5A is thus utilized for an emergent cutoff. The small flow three-way solenoid valve 5B has solenoids C and D for switching the cutoff valve 1, and an effective sectional area smaller than that of the large flow three-way solenoid valve 5A. The small flow three-way solenoid valve 5B is utilized for testing the operation of the cutoff valve control apparatus. Inlet ports IN, outlet ports OUT, and exhaust ports EXH of the respective large flow and small flow three-way solenoid valves 5A and 5B are connected to one another. The solenoid valve 5 has one common inlet port IN, one common outlet port OUT, and one common exhaust port EXH, each of which is connected to the associated the inlet ports IN, the outlet ports OUT, and the exhaust ports EXH of the large flow and small flow three-way solenoid valves 5A and 5B. The solenoid valve 5 supplies an air, which is supplied with an air supply source 11 disposed outside of the positioning box 4, to the cylinder 31 of the air cylinder 3 in the following manner. The supplied air enters the common inlet port IN and flows through the large flow three-way solenoid valve 5A or the small flow three-way solenoid valve 5B and flows out of the common outlet port OUT of the solenoid valve 5, and enters the cylinder 31. The air in the cylinder 31 is discharged to atmosphere through in order of the common outlet port OUT, the large flow or the small flow three-way solenoid valve 5A, 5B, and the common exhaust port EXH.

Figure 3:
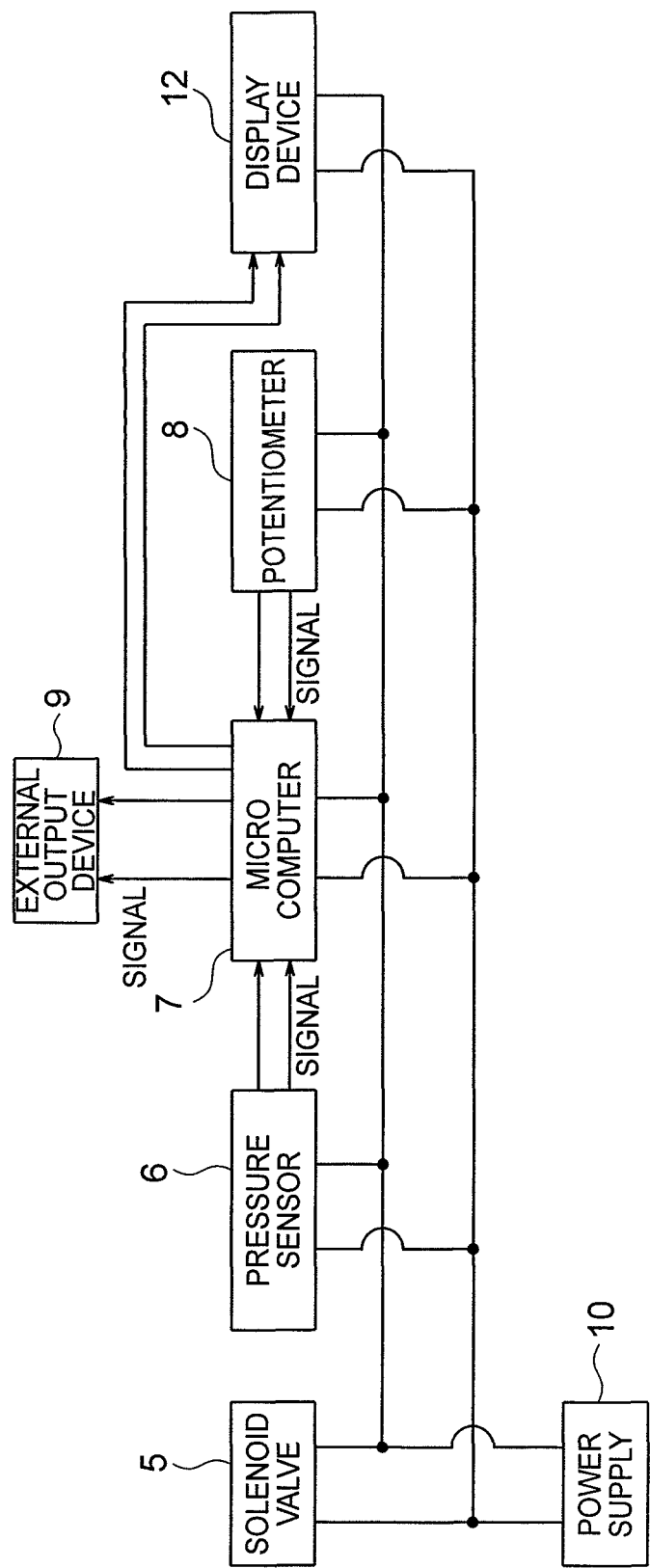
FIG. 3 is a block diagram showing the one embodiment of the cutoff valve control apparatus of the present invention.

FIG. 3 is a block diagram showing an electrical configuration of the cutoff valve control apparatus. In the cutoff valve control apparatus, the solenoid valve 5, the pressure sensor 6, the microcomputer 7, the potentiometer 8 and the display device 12 are connected to the power supply 10. The pressure sensor 6 detects a pressure near the air inlet opening 36 of the cylinder 31 of the air cylinder 3 and sends a detected signal to the microcomputer 7. The potentiometer 8 detects the rotation position of the valve axle 1b and sends the detected signal to the microcomputer 7. The microcomputer 7 controls to energize the solenoids of the solenoid valve 5, processes the detected signals received from the pressure sensor 6 and the potentiometer 8, judges the cutoff valve control apparatus the normal state or in the failure, and outputs the judged signal through an external output device 9.

The cutoff valve control apparatus is test operated at the installation. The solenoid valve 5 supplies the air to the air cylinder 3 to switch the cutoff valve 1 from closing to opening. The change of the internal pressure of the cylinder 31 of the air cylinder 3 is measured with respect to time. The change of the internal pressure is referred to as "pressure characteristic". Failure of the respective devices such as the solenoid valve 5, the air cylinder 3 and the cutoff valve 1 of the cutoff valve control apparatus is predicted with the pressure characteristic.

A routine operation of the cutoff valve control apparatus is explained before explaining a method of the failure prediction.

The solenoid valve 5 to switch the air cylinder 3 includes the large flow three-way valve 5A and the small flow three-way valve 5B. In the routine operation, the large flow three-way solenoid valve 5A is utilized and all of three ports of the small flow three-way solenoid valve 5B are de-energized so that the all ports are closed. The microcomputer 7 controls the power supply to the large flow three-way solenoid valve 5A and the small flow three-way solenoid valve 5B so that one valve is energized and the other valve is de-energized. The microcomputer 7 prevents both valves from being energized at the same time.

When the solenoid A of the large flow three-way solenoid valve 5A is de-energized and the solenoid B thereof is energized, the air supplied from the air supply source 11 flows in order of the common inlet port IN of the solenoid valve 5, the large flow three-way solenoid valve 5A, the common outlet port OUT, and the air inlet opening 36 so that the air is supplied to the cylinder 31 to slide the piston 34 to the left and completely open the cutoff valve 1. Under the solenoid B energized, the pipeline is operable. The microcomputer 7 interlocks to prevent the both solenoids A, B from being energized at the same time.

When the plant facility indicates the abnormal signal or the emergency cutoff signal, the microcomputer 7 energizes the solenoid A so that the air inside the cylinder 31 flows in order of the outlet port OUT of the solenoid valve 5, the large flow three-way solenoid valve 5A, the common exhaust port EXH, and the atmosphere. The piston 34 is moved from left to right with the spring load and rotates the valve axle 1a by 90 degrees to completely close the cutoff valve 1. The pipeline is thus emergency stopped while the solenoid A is energized.

The above operation controls to energize either the solenoid A or the solenoid B. As another example, while the solenoid A is de-energized and the solenoid B is also de-energized after the cutoff valve 1 is fully opened with the solenoid B being energized, the large flow three-way solenoid valve 5A blocks all ports to keep the cutoff valve 1 the full open state. While the solenoid B is de-energized and the solenoid A is also de-energized after the cutoff valve 1 is fully closed with the solenoid A being energized, the large flow three-way solenoid valve 5A blocks all ports to keep the cutoff valve 1 the full close state. Accordingly, when the cutoff valve 1 is in the full open state or the full close state, both the solenoid A and the solenoid B are de-energized to reduce the electric power consumption.

The test operation at the installation for the failure prediction is explained. The test operation utilizes the small flow three-way solenoid valve 5B.

When the cutoff valve control apparatus is installed in the pipeline and the cutoff valve 1 is in the full close state, the microcomputer 7 controls to energize the solenoid C of the small flow three-way solenoid valve 5B based on an actuating signal of a test operation switch (not shown), and to de-energize the large flow three-way solenoid valve 5A for closing the all ports so that the air supplied from the air supply source 11 flows in order of the common inlet port IN of the solenoid valve 5, the small flow three-way solenoid valve 5B, the common outlet port OUT, the air inlet opening 36, and into the cylinder 31. The piston 34 is thus slid from right to left against the spring load to move the cutoff valve 1 from the full close state to the open state.

The microcomputer 7 controls to de-energize the solenoid C when the cutoff valve 1 changes from the full close state to the full open state, and controls to simultaneously energize the solenoid D.

When the solenoid D is energized, the air in the cylinder 31 flows in order of the air inlet opening 36, the outlet port OUT of the solenoid valve 5, the small flow three-way solenoid valve 5B, the common exhaust port EXH, and the atmosphere. The piston 34 is thereby slid from left to right with the spring load and rotates the valve axle 1a by 90 degrees to resume the cutoff valve 1 in the full close state. The microcomputer 7 controls to energize only either one of the solenoids of the small flow three-way solenoid valve 5B.

For the operation test with the cutoff valve control apparatus being installed, the pressure sensor 6 measures the change of the internal pressure of the cylinder 31 of the air cylinder 3 with respect to the time when the cutoff valve 1 is operated from the full close state to the full open state. The time change of the internal pressure is referred to as the pressure characteristic. The failure of the cutoff valve control apparatus is judged based on the change of the measured pressure characteristic. The judgment of the failure is achieved by comparing the measured pressure characteristic obtained at the operation test with a pressure characteristic of the initial normal operation (line graph A in FIG. 4 as described later) and a pressure characteristic of a failure prediction boundary (failure prediction boundary lines B1-B3 in FIG. 4 as described later).

The pressure characteristic of the initial normal operation (line graph A in FIG. 4) and the pressure characteristic of the failure prediction boundary (the failure prediction boundary lines B1-B3 in FIG. 4) are determined in the following steps.

The air cylinder 3 is driven with the change of the internal pressure of the cylinder 31 as follows. When the cutoff valve 1 is moved from the full close state to the full open state and the air is supplied from the air inlet opening 36, the piston 34 is subjected to a force of Ac×P, where Ac is area of the piston ($=\pi D^2/4$) with a diameter of D, and P is the internal pressure). The spring load is given by kx, where k is a spring constant and x is a displacement of the coil spring 35.

When $(mx''+Cx'+kx)<(P\times Ac)$ is satisfied, the piston 34 is moved from right to left (where m is a mass of the piston, C is a starting resistance (friction resistance) of the piston, and x, x', x'' are the displacement, velocity and acceleration of the piston, respectively), and rotates the valve body 1a of the cutoff valve 1 connected to the piston 34 toward the open state. When the piston 34 of the cylinder 31 is most leftward moved by the maximum displacement distance of x, the ball-shaped valve body 1a of the cutoff valve 1 is rotated by 90 degrees into the full open state.

When the cutoff valve 1 is switched from the full open state to the full close state, the air in the cylinder 31 is discharged to the atmosphere through the small flow three-way solenoid valve 5B. When the relation of $kx>[(P\times Ac)+mx''+Cx']$ is satisfied, the piston 34 is moved from left to right and rotates the ball-shaped valve body 1a of the cutoff valve 1 connected to the piston 34 toward the close state. When the piston 34 of the cylinder 31 is most rightward moved by the maximum displacement distance of x, the ball-shaped valve body 1a of the cutoff valve 1 is rotated by 90 degrees into the full close state.

When the cutoff valve control apparatus is installed in the pipeline of the plant facility and test operated, the cutoff valve 1 is switched from the full close state to the full open state with the small flow three-way solenoid valve 5B. The change of the internal pressure of the cylinder of the air cylinder 3 is measured with respect to the time. The pressure characteristic of the initial normal operation at the installation is then stored beforehand in the memory device of the microcomputer 7.

The microcomputer 7 establishes the following equation of motion, equation of state and equation of thermal energy to approximate the measured values by changing the respective parameters, and stores the parameters fitted to the measured values.

Equation of Motion:

$$mx''+Cx'+P\times Ac=kx, \quad \text{Eq. (1)}$$

where m: mass of the piston of the air cylinder 3, C: starting resistance of the air cylinder 3, x: displacement of the air cylinder 3, x': velocity of the air cylinder 3, x'': acceleration of the air cylinder 3, P: internal pressure of the cylinder of the air cylinder 3, and Ac: area of the air cylinder 3 exposing to the pressure.

Equation of State:

$$dP/dt=(R\theta a/Vc)G-(P/Vc)(dV/dt)+(WR/Vc)(d\theta c/dt), \quad \text{Eq. (2)}$$

where R: gas constant of air, θa: temperature of an inner surface of the cylinder of the air cylinder 3 (assuming that the temperature is same as ambient temperature of the cylinder), Vc: volume of the air cylinder 3, G: mass of the air flowing, W: mass of the air, θc: temperature inside the cylinder of the air cylinder 3. The θa is determined with the microcomputer 7 based on a detection signal of the temperature of a temperature sensor (not shown). The θc is determined by calculation with the Vc, P and Boyle-Charle's law.

$$G=kg\times Qn, \quad \text{Eq. (3)}$$

where kg: coefficient, Qn: volume of air flowing (standard state). The flowed volume Qn is determined with the following equation.

$$Qn=11.1SePc\sqrt{(\theta o/\theta c)} \text{ when } (Pa/P)<0.528, \quad \text{Eq. (4)}$$

where Pa: atmospheric pressure, Se: effective sectional area of the small flow three-way solenoid valve 5B, θo: temperature of air at standard state (273° K).

$$Qn=22.2SePc\sqrt{Pa(P-Pa)}\sqrt{(\theta o/\theta c)} \text{ when } (Pa/P)\geq 0.528. \quad \text{Eq. (5)}$$

Equation of Thermal Energy:

$$d\theta c/dt=(R\theta c/CvW)G+(hSh/CvW)(\theta a-\theta c), \quad \text{Eq. (6)}$$

where Cv: specific heat at constant volume of air, h: thermal conductivity between the inner wall of the cylinder and the air, and Sh: surface area of the inner wall of the cylinder.

The failure diagnosis is judged with the equation of state (2) including the respective calculated parameters to be fitted to the measured values of the change of the internal pressure of the cylinder (pressure characteristic). The equation of state (2) does not consider the temperature change due to the change of the internal pressure of the cylinder and the equation of the thermal energy (6) is thus utilized to correct the temperature. The displacement x of the equation of motion is zero from the actuation time of the operation test switch to the actual movement of the cutoff valve 1 and from the full close state of the cutoff valve 1 to the cylinder internal pressure of 0 MPa. The equation of state (2) and the equation of thermal energy (6) are thus applied.

Figure 4:
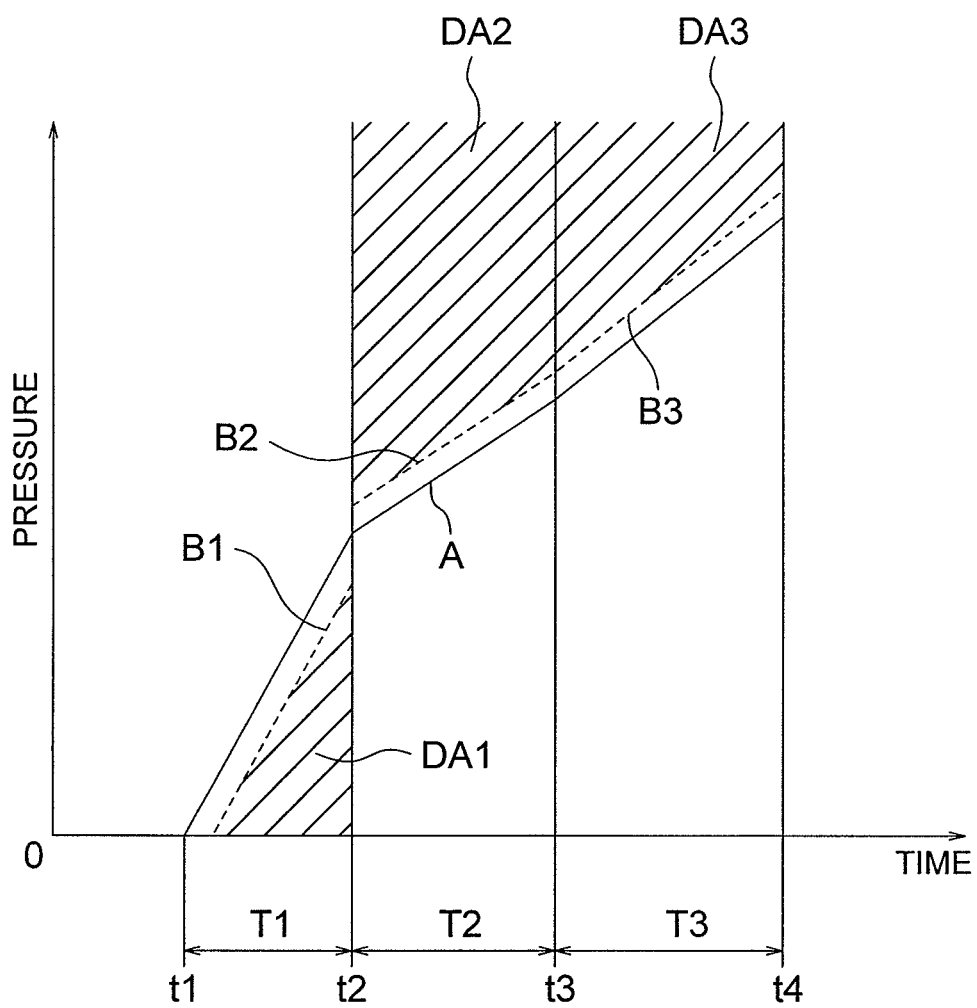
FIG. 4 is a graph showing a pressure characteristic of an internal pressure of the air cylinder of the one embodiment.

The equation of state (2) to be fitted with the calculated parameters is indicated by the line graph A of FIG. 4. The line graph A is the pressure characteristic of the initial normal operation at the installation of the cutoff valve control apparatus. The line graph A is beforehand stored in the memory device in the microcomputer as the pressure characteristic of the initial normal operation at the installation of the apparatus.

The line graph A indicates that the operation test switch is turned on to energize and start the operation of the small flow three-way solenoid valve 5B at a time t1, the operation of the air cylinder 3 starts at a time t2, the operation of the cutoff valve 1 starts at a time t3, and the cutoff valve 1 is in the full open state at a time t4.

The small flow three-way solenoid valve 5B is energized at the time t1 and a certain amount of the air is supplied to the cylinder 31 per unit time. The piston 34 is not moved due to the starting resistance. The internal pressure of the cylinder 31 linearly increases from zero (atmospheric pressure) during a period of time T1 between the time t1 and t2 in response to the air supplied from the small flow three-way solenoid valve 5B.

The piston 34 is moved from right to left at the time t2 and the cutoff valve 1 is opened. The movement of the piston 34 provides a wide space for the air supplied from the small flow three-way solenoid valve 5B. The internal pressure of the cylinder 31 linearly increases during a period of time T2 between the time t2 and the time t3 with a gradient less than the pressure change of the period of time T1.

The cutoff valve 1 moves from the full close state to the open state at the time t3. When the cutoff valve 1 starts to move, the internal pressure of the cylinder 31 linearly increases in a period of time T3 between the time t3 and the time t4. The gradient of the pressure change during the period of time T3 is larger than that of the period of time T2 and smaller than that of the period of time T1 due to the starting resistance.

The pressure characteristic of the internal pressure of the cylinder 31 at the normal operation has the line graph indicated by the solid line A with the gradient changes from the time t1 to the time t4. It is apparent that the gradient changes at the time t2 and t3 indicate the gradient changes between the period of time T1 and T2, and between the period of time T2 and T3.

When the small flow three-way solenoid valve 5B is in failure and moves slowly, the air is supplied from the air supply source 11 with less amount compared to the normal operation. It is thus expected that the internal pressure of the cylinder is lower than that of the normal operation at the period of time T1. A pressure level lower than the line graph A of the normal operation at the period of time T1 is determined with a certain allowable value indicated by a dotted line as the failure prediction boundary line B1.

When the air cylinder 3 is in failure due to such as sticking or increase of sliding resistance caused by degradation of the seal of the pistons 33, 34 of the air cylinder 3 with time, it is then expected that the internal pressure of the cylinder at the period of time T2 is higher than that of the normal operation. A pressure level higher than the line graph A of the normal operation at the period of time T2 is determined with a certain allowable value indicated by a dotted line as the failure prediction boundary line B2.

When the cutoff valve 1 is in failure due to such as increase of the starting resistance caused by degradation of the sheet seal 1c or the ground seal 1d with time, it is then expected that the internal pressure of the cylinder at the period of time T3 is higher than that of the normal operation. A pressure level higher than the line graph A of the normal operation at the period of time T3 is determined with a certain allowable value indicated by a dotted line as the failure prediction boundary line B3.

The pressure characteristics of the failure prediction boundary lines B1-B3 determined at the periods of time T1-T3 are beforehand stored in the memory device of the microcomputer 7. Areas between the pressure characteristic of the line graph A of the normal operation and that of the failure prediction boundary lines B1-B3 are referred to as a normal operation area. Areas outside the areas between the pressure characteristic of the normal operation and the pressure characteristics of the failure prediction boundary lines B1-B3 are referred to as a dangerous operation area.

Referring to FIG. 4, DA1-DA3 indicated by hatchings are the dangerous operation areas. When the measured internal pressure of the cylinder is in the dangerous operation area DA1 at the period of time T1, it indicates that the operation of the solenoid valve becomes slow and is in the abnormal state. When the measured internal pressure of the cylinder is in the dangerous operation area DA2 at the period of time T2, it indicates that the operation of the air cylinder 3 is in the abnormal state due to the sticking and slow movement. When the measured internal pressure of the cylinder is in the dangerous operation area DA3 at the period of time T3, it indicates the sticking (mainly the sheet seal 1c or the ground seal 1d) or the slow movement of the cutoff valve 1.

As described above, the pressure characteristic of the normal operation indicated by the line graph A and the pressure characteristics of the failure prediction boundary lines B1-B3 are stored in the memory device in advance when the cutoff valve control apparatus is set.

The cutoff valve control apparatus is then installed in the plant facility and is test operated at the setting condition so that the cutoff valve 1 is switched from the full close state to the full open state to confirm the operation. The internal pressure of the cylinder of the air cylinder 3 is measured with the pressure sensor 6 and the measured pressure characteristic is stored in the memory device of the microcomputer 7.

The measure pressure characteristic is then compared to the line graph A of the initial normal operation and the failure prediction boundary lines B1-B3 beforehand stored in the memory device to judge the presence of the failure. The result of the decision is "normal state" or "abnormal state".

When the measured pressure characteristic is in the area of the normal operation area between the line graph A and the lines B1-B3, it is judged that the cutoff valve control apparatus is in the normal state. When the cutoff valve control apparatus is in the normal state, it is assumed that the apparatus has a liability of one year since then.

When the measured pressure characteristic is in the dangerous operation area outside the area between the line graph A and the lines B1-B3, the apparatus is judged to be in the abnormal state. When the apparatus is in the abnormal state, it is necessary to inspect the solenoid valve 5, the air cylinder 3 or the cutoff valve 1 or replace them with the associated new device.

The result of the judgment is outputted with an electrical signal of a direct current of 4-20 mA with the external output device 9 through the microcomputer 7. It is also possible to display the line graph A of the normal operation, the failure prediction boundary lines B1-B3, and the measured pressure characteristic on the display device 12 in order to visually judge the normal/abnormal state. The display device 12 permits the visual inspection of the position of the measured pressure characteristic with respect to the normal operation area defined by the line graph A and the lines B1-B3 and the dangerous operation area to predict the failure of the apparatus.

Figure 6:
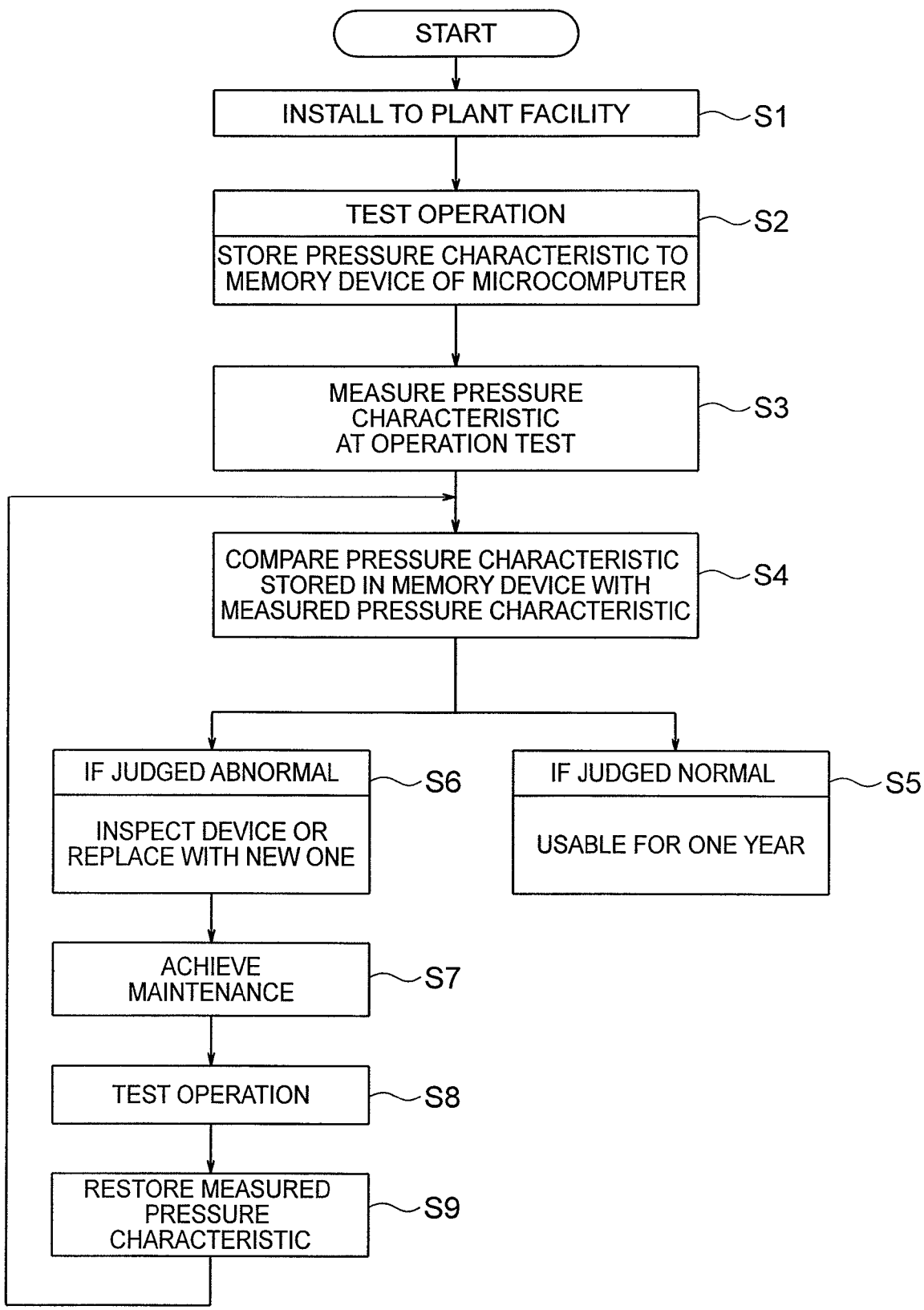
FIG. 6 is a flowchart illustrating steps of a failure diagnosis of the cutoff valve control apparatus of the one embodiment.

FIG. 6 shows a flowchart illustrating the steps of the failure diagnosis. At step S1, a standard cutoff valve control apparatus is installed in the pipeline of the plant facility in order to measure the pressure characteristic of the internal pressure of the cylinder at the normal operation. At step S2, when the plant facility is test operated, the small flow three-way solenoid valve 5B is adapted for the full stroke operation of the cutoff valve 1 from the full close state to the full open state, the change of the internal pressure of the cylinder 31 of the air cylinder 3 with respect to the time is measured, and the pressure characteristic of the initial normal operation (line graph A) and the failure prediction boundary lines B1-B3 including the allowable values with respect to the normal operation based on the equations described above are stored in the memory device of the microcomputer 7.

At step S3, a cutoff valve control apparatus for a client is installed in the pipeline of the plant facility, the cutoff valve control apparatus for the client beforehand including the pressure characteristics of the initial normal operation (line graph A of FIG. 4) measured with the standard cutoff valve control apparatus and the failure prediction boundary lines B1-B3 determined by the standard cutoff valve control apparatus in the memory device. The test operation at the setting of the standard cutoff valve control apparatus is carried out for the apparatus of the client in order to measure the pressure characteristic of the internal pressure of the cylinder of the air cylinder 3. At step S4, the measured pressure characteristic is compared to the pressure characteristic (line graph A) and the failure prediction boundary lines B1-B3 stored in the memory device of the microcomputer 7 of the client to judge the cutoff valve control apparatus the normal state or the abnormal state with the microcomputer 7.

At step S5, if the measured pressure characteristic is in the normal operation area between the line graph A and the lines B1-B3, the apparatus is judged to be in the normal state. When the judgment shows the normal state, the cutoff valve control apparatus is utilized for another one year.

At step S6, if the measured pressure characteristic is in the dangerous operation area outside the area between the line graph A and the lines B1-B3, the apparatus is judged to be in the abnormal state. The display device 12 permits the visual inspection of the position of the measured pressure characteristic with respect to the dangerous operation area to predict the failure. When the judgment is the abnormal state, the air cylinder 3, the cutoff valve 1 or the small flow three-way solenoid valve 5B is inspected or replaced with the associated new one.

When the measured pressure characteristic at the period of time T1 in FIG. 4 is in the area of the dangerous operation area DA1, it indicates the failure of the solenoid valve 5. The position of the measured pressure characteristic in the dangerous operation area DA1 predicts a degree of the abnormal state of the solenoid valve 5. When the measured pressure characteristic at the period of time T2 is in the area of the dangerous operation area DA2, it indicates the failure of the air cylinder 3. The position of the measured pressure characteristic in the dangerous operation area DA2 predicts the degree of the abnormal state of the air cylinder 3. When the measured pressure characteristic at the period of time T3 is in the area of the dangerous operation area DA3, it indicates the failure of the cutoff valve 1. The position of the measured pressure characteristic in the dangerous operation area DA3 predicts the degree of the abnormal state of the cutoff valve 1. The anomaly (failure) of the cutoff valve 1 mainly originates from the degradation of the sheet seal 1c and the ground seal 1d and it is necessary to replace the associated component with the new one.

Figure 5:
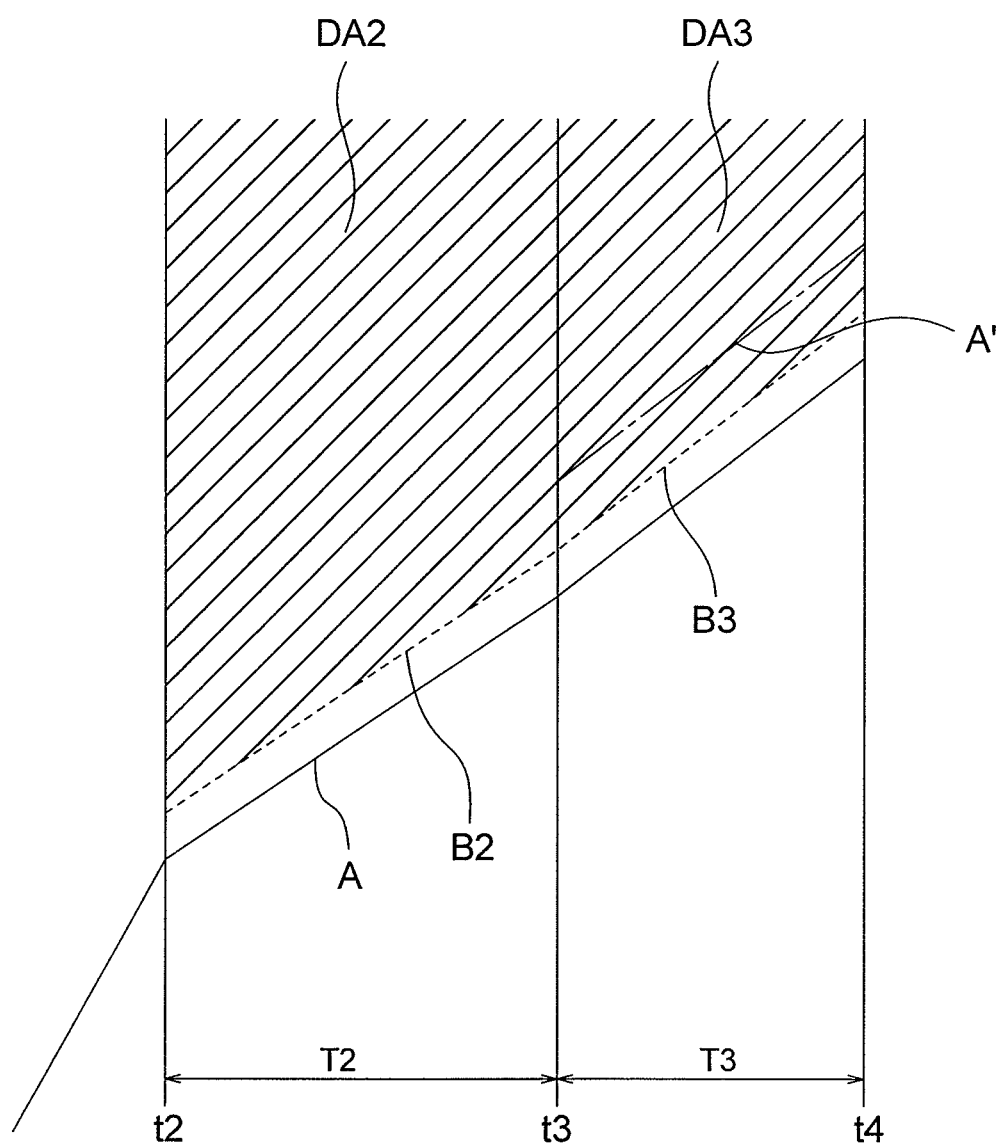
FIG. 5 is an enlarged view of the graph of FIG. 4.

Referring to FIG. 5, when the measured pressure characteristic indicated by a dot-dashed line A' is in the dangerous operation area DA3 at the period of time T3 and is nearly parallel to the line graph A at the same period of time T3, it is judged that the cutoff valve 1 is normal and the air cylinder 3 is in failure. When the measured pressure characteristic at the period of time T3 has the same pressure characteristic of the normal operation, it is assured that the cutoff valve 1 operates at the normal state. The same prediction can also be applied to the period of time T2. When the measure pressure characteristic at the period of time T2 is in the dangerous operation area DA2 and is nearly parallel to the line graph A of the same period of time T2, it is judged that the air cylinder 3 is normal and the small flow three-way solenoid valve 5 is abnormal.

At step S7, the faulty device judged at step S6 is inspected or replaced with the new one. At step S8, the inspected or the replaced device is test-operated. At step S9, the procedure same as step S3 is applied to the inspected or the replaced component. The pressure characteristic of the initial normal operation (line graph A) is again stored in the memory device (updating the line graph A of step S3), and the process returns to step S4.

The present invention is not limited to the embodiment, and any modification or applications thereof is within the scope of the present invention.

For example, the display device 12 may display a different color depending on the periods of time T1-T3, respectively.

The solenoid valve 5 of the embodiment has the small flow three-way solenoid valve 5A and the large flow three-way solenoid valve 5B. It is apparent that the solenoid valve 5 may have a large flow four-way solenoid valve and a small flow four-way solenoid valve. The solenoid valve 5 supplies the air to the air cylinder 3 from the air supply source 11 when the solenoid valve 5 is energized. It is apparent that the air may be supplied to the air cylinder 3 when the solenoid valve 5 is de-energized.

Figure 7:
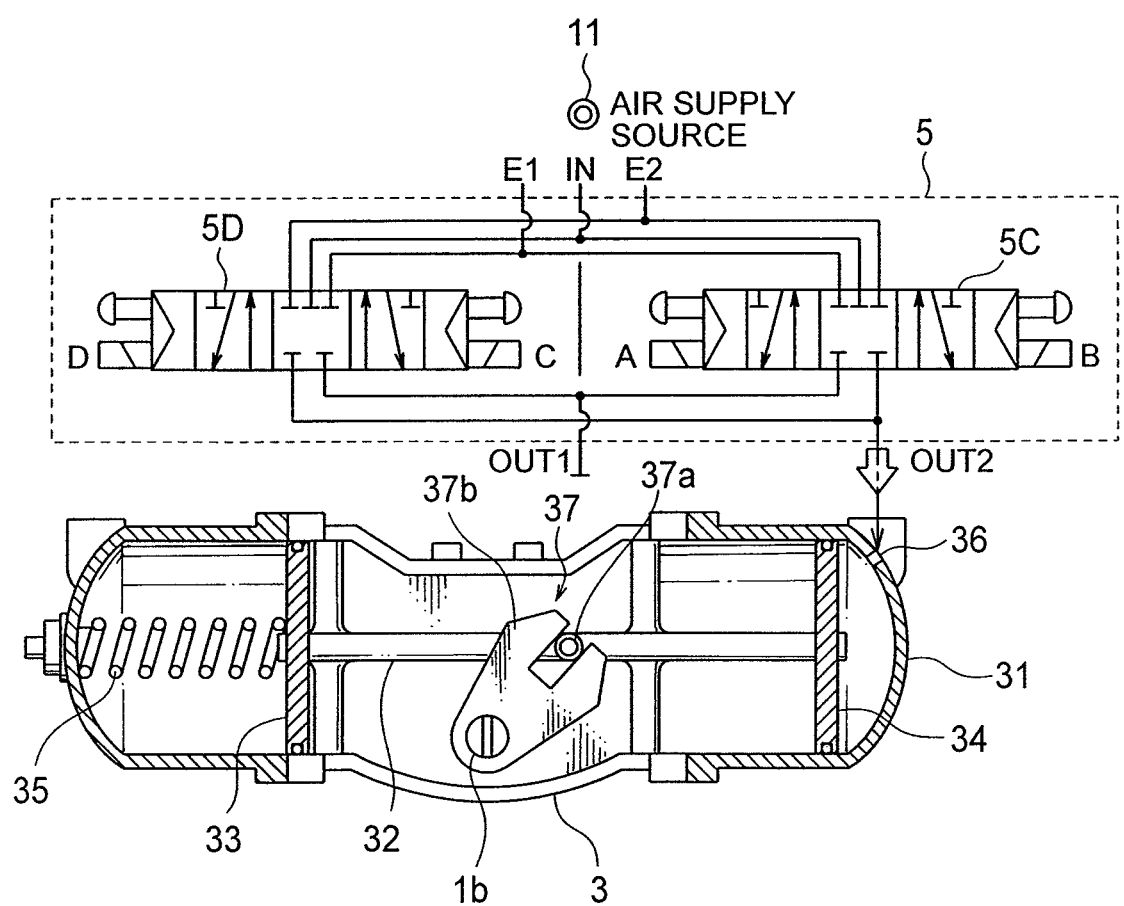
FIG. 7 is a block diagram showing an air cylinder and a solenoid valve of other embodiment of the cutoff valve control apparatus of the present invention.

FIG. 7 shows a configuration showing the cutoff valve control apparatus including the solenoid valve 5 having a large flow four-way solenoid valve and a small flow four-way solenoid valve. The solenoid valve 5 includes the two four-way solenoid valves to switch the air cylinder 3. The outlet port OUT1 or the outlet port OUT2 may be plugged for use as the three-way solenoid valve. An inlet port IN, an outlet port OUT1, an outlet port OUT2, an exhaust port E1 and an exhaust port E2 of the respective large flow four-way solenoid valve 5C and the small flow four-way solenoid valve 5D are connected to one another. The solenoid valve 5 includes a common inlet port IN, a common outlet port OUT1 and OUT2, and a common exhaust port E1 and E2. The large flow four-way solenoid valve 5C is normally utilized. The small flow four-way solenoid valve 5D is de-energized and all of the five ports are closed. The large flow four-way solenoid valve 5C and the small flow four-way solenoid valve 5D are prevented from being simultaneously energized.

When the outlet port OUT1 is plugged and the solenoid A of the large flow four-way solenoid valve 5C is de-energized and the solenoid B thereof is energized, the air is supplied in order of the IN port, the outlet port OUT2 and the cylinder 31 of the air cylinder 3 so that the cutoff valve 1 is in the full open state. The simultaneous energization of the both solenoids of the large flow four-way solenoid valve 5C is not permitted with interlock. When the solenoid B is de-energized while the solenoid A is in de-energized state, the all ports of the large flow four-way solenoid valve 5C are closed and the cutoff valve remains the full open state.

When the microcomputer 7 controls to energize the solenoid A based on the detected abnormal signal or the actuation signal of the emergency cutoff switch (not shown), the airflow from the IN port to the outlet port OUT1 is prevented with the plug. The air in the air cylinder 31 flows in order of the outlet port OUT2 of the large flow four-way solenoid valve 5C, the E2 port and the atmosphere. The cutoff valve 1 becomes in the full close state with the spring load. The pipeline is then quickly blocked off while the solenoid A is energized. The small flow four-way solenoid valve 5D used for the failure diagnosis has also the same function.

In the one and anther embodiment, the either one of the solenoid A and B of the associated large flow three-way solenoid valve 5A or the large flow four-way solenoid valve 5C is kept energized when the cutoff valve 1 is in the full open state or the full close state. It is apparent that the both solenoids A and B may be de-energized after the cutoff valve 1 is in the full open state or the full close state. In this case, the all ports of the large flow three-way solenoid valve 5A or the large flow four-way solenoid valve 5C are blocked. The blocking thus reduces the electrical power consumption and keeps the cutoff valve 1 in the full open state or the full close state. The cutoff valve 1 can be held at an arbitrary degree of opening with use of blocking of the all ports. This operation is common to the small flow three-way solenoid valve 5B or the small flow four-way solenoid valve 5D. This function serves to keep the cutoff valve in position when the cutoff valve will not return to the full open state due to the failure at the operation test.

In the embodiment, the measured pressure characteristic is compared to the line graph A and the boundary lines B1-B3 to judge the failure or the abnormal state. It is apparent that the pressure measured at a certain time after the operation may be compared to a pressure P1 of the line graph A at the time and a pressure P2 of the boundary lines B1-B3 at the time. When the measured pressure is in the range of P1-P2, it is judged that the cutoff valve control apparatus is normal. When the measured pressure is outside the range of P1-P2, it is judged that the apparatus is in the abnormal state.

The hatching areas of FIGS. 4 and 5 are assigned as the dangerous operation area in the above embodiment. The area, which is not shaded, outside the normal operation area may be assigned as the dangerous operation area.

The embodiment discloses the failure diagnosis of the cutoff valve control apparatus after installing it to the pipeline of the plant facility. It is apparent that the failure diagnosis may be achieved prior to the installing of the cutoff valve control apparatus.

The times t1-t3 indicate the starting time of the associated operation, and the gradient changes of the pressure characteristics at the time t2 and the time t3 indicate the gradient changes of the previous and next period of time. It is apparent that the detection signal of the potentiometer 8 can be used for the failure diagnosis besides the pressure characteristic.

The present invention judges the normal and the abnormal state of the apparatus with the pressure characteristic of the internal pressure of the cylinder of the air cylinder 3 and the pressure characteristic of the failure prediction boundary. It is apparent that the gradient of the pressure characteristic of the normal operation at the respective periods of time may be compared to the gradient of the measured pressure characteristic of the corresponding period of time. When the gradient of the measured pressure characteristic is not over than the predetermined threshold value of gradient determined by the pressure characteristic of the normal operation, the relevant device associated with the period of time is in the normal state. When the measured pressure characteristic is higher than the predetermined threshold value, the relevant device associated with the period of time is in the abnormal state. For example, the gradient of the measured pressure characteristic at the period of time T3 is same as that of the pressure characteristic of the normal operation, it is judged that the cutoff valve is in the normal state. When the gradient of the measured pressure characteristic at the period of time T3 is higher than the threshold value, it is judged that the cutoff valve 1 is in the abnormal state.

The present invention achieves the failure diagnosis with the pressure characteristic of the internal pressure of the cylinder of the air cylinder 3. It is apparent that the failure diagnosis can be achieved with a displacement characteristic determined by a detection voltage signal of the potentiometer 8. The potentiometer 8 can be replaced with a positioner or a rotary encoder.

Figure 8:
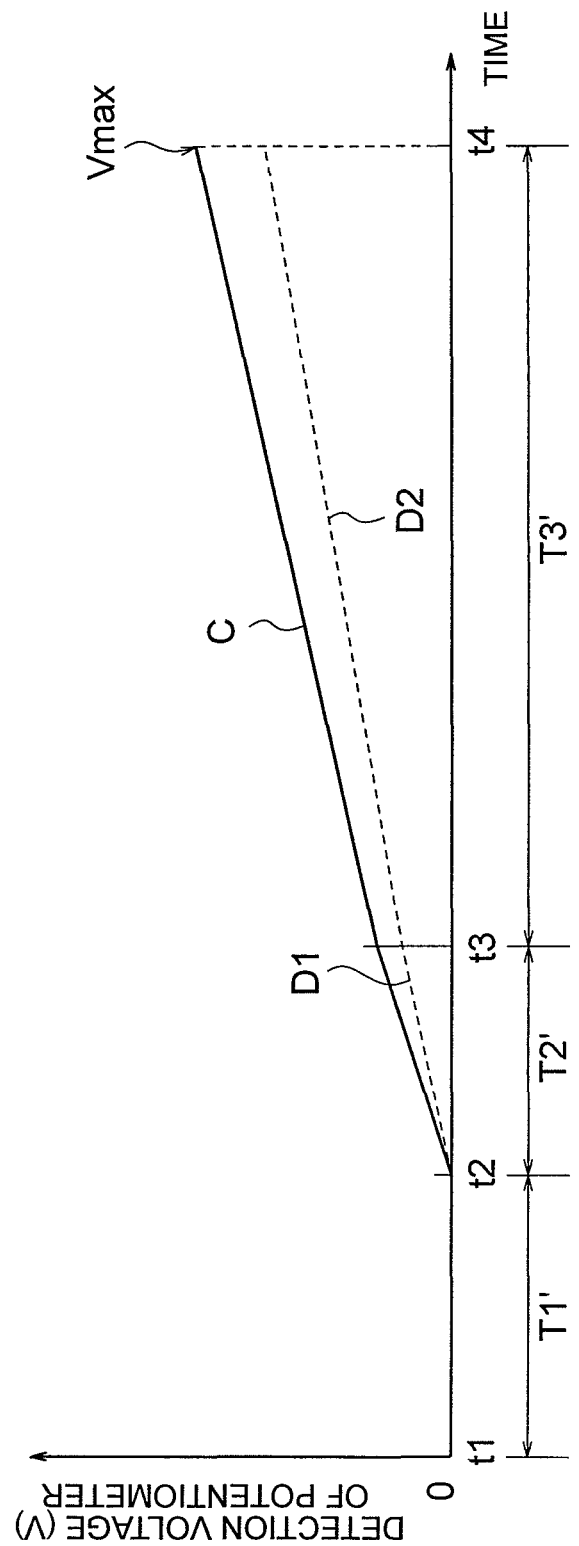
FIG. 8 is a graph showing a displacement characteristic of a potentiometer of the other embodiment of the cutoff valve control apparatus of the present invention.

FIG. 8 shows a displacement characteristic C of the initial normal operation of the standard cutoff valve control apparatus installed in the plant facility. The displacement characteristic C is obtained by measuring the time change of the detection voltage signal of the potentiometer 8 when the operation test is carried out for the standard cutoff valve control apparatus. The displacement characteristic C of the initial normal operation of the standard cutoff valve control apparatus is beforehand stored in the memory device of the microcomputer 7. The displacement characteristic C, that is, the detection voltage, is zero in a period of time T1' between a time t1 (starting time of the small flow solenoid valve 5B) and a time t2 (starting time of the air cylinder 3), increases linearly with a certain gradient in a period of time T2' between the time t2 and a time t3 (starting time of movement from the full close state to opening of the cutoff valve 1), and increases linearly with a certain gradient, which is less than that of the period of time T2', in the period of time T3' between the time t3 and a time t4 (the cutoff valve 1 is in the full open state at the time t4) and reaches to the maximum voltage (Vmax) at the time t4. The change of the detection voltage represents the displacement of position (rotation position of the valve axle 1b) from the starting time of the solenoid valve to the full open state of the cutoff valve 1. The potentiometer 8 outputs the detection voltage signal indicating the rotation position of the valve axle 1b at the period of time T2'. Although the valve axle 1b rotates during the period of time T2', the rotation of the valve axle 1b is not transmitted to the valve body 1a due to the mechanical allowance.

Displacement characteristics D1, D2 of failure prediction boundaries indicated by dotted lines are determined by allowing threshold values of gradients of the displacement characteristic C of the normal operation at the associated periods of time. The prediction boundaries each have a gradient less than that of the normal operation at the associated period of time. When the measured displacement characteristic of the potentiometer 8 at the operation test is in the area between the line graph C and the line graphs D1 and D2, it is judged that the cutoff valve control apparatus is in the normal state. When the measured displacement characteristic of the potentiometer 8 is outside the area thereof, that is, in the area between 0 volt and the line graphs D1 and D2, it is judged that the cutoff valve control apparatus is in the abnormal state. The abnormal state at the period of time T2' judges the air cylinder 3 the abnormal state and the abnormal state at the period of time T3' judges the cutoff valve 1 the abnormal state. It is apparent that the display device 12 may display the measured value of the detection voltage signal of the potentiometer 8, the displacement characteristic C of the normal operation, and the failure prediction boundary lines D1 and D2 so that the decision of the normal/abnormal state can be visualized. The display device 12 allows the failure prediction by visualizing the position of the measured pressure characteristic with respect to the normal operation area or the dangerous operation area defined by the line graphs A and B1-B3.

The present invention judges the normal/abnormal state of the cutoff valve control apparatus with comparison between the measured displacement characteristic and the displacement characteristics of the line graphs C, D1 and D2. It is apparent that the measured detection voltage of the potentiometer 8 at a certain time in the period of time T2'-T3' can be compared to the voltage V1 at the line graph C and the voltage V2 at the line graph D1 or D2 at the certain time. When the measured voltage is in the range of V1-V2, the cutoff valve control apparatus is judged to be in the normal state, and when the measured voltage is lower than V1 or V2, it is judged that the cutoff valve control apparatus is in the abnormal state.

When the displacement characteristic of the potentiometer 8 at the normal operation is not linear, the displacement characteristics D1 and D2 of the dangerous prediction boundaries are defined by the voltages lower than the voltage of the normal operation by a certain allowable value.

What is claimed is:

1. A cutoff valve control apparatus comprising:
a cutoff valve;
a control device including an air cylinder for controlling rotation of a valve axle of the cutoff valve and a solenoid valve for supplying air from an air supply source to the air cylinder and exhausting the air from the air cylinder to control the degree of opening of the cutoff valve;
a pressure sensor for detecting an internal pressure of the air cylinder;
a judging device for judging a normal state or an abnormal state of the cutoff valve control apparatus based on a pressure characteristic of the internal pressure of the air cylinder measured with the pressure sensor when the air from the air supply source is supplied to the air cylinder under control of the control device; and
a memory device for storing beforehand the pressure characteristic of the internal pressure of the air cylinder of an initial normal operation of the cutoff valve control apparatus and the pressure characteristic of a failure prediction boundary, both pressure characteristics showing lines, if graphed with respect to time,
wherein the respective lines are recorded during, in order, an operation starting time t1 of the solenoid valve, an operation starting time t2 of the air cylinder, an operation starting time t3 of the cutoff valve, and a fully opened time t4 of the cutoff valve, the internal pressure between t1-t2, t2-t3, and t3-t4 linearly increases, the gradients of the lines are set as (t2-t3)<(t3-t4)<(t1-t2), and the pressure characteristic of the failure prediction boundary is lower between t1-t2 and higher between t2-t4 than that of the initial normal operation,
wherein the judging device judges (1) the cutoff valve control apparatus as being in the normal state when the measured pressure characteristic is in an area between the pressure characteristic of the normal operation and the pressure characteristic of the failure prediction boundary, and (2) the cutoff valve control apparatus as being in the abnormal state when the measured pressure characteristic is outside the area between the pressure characteristic of the normal operation and the pressure characteristic of the failure prediction boundary.

2. The cutoff valve control apparatus as claimed in claim 1, wherein the judging device judges (1) the solenoid valve as being in the normal state or the abnormal state based on the pressure characteristic measured from the operation starting time of the solenoid valve to the operation starting time of the air cylinder, (2) the air cylinder as being in the normal state or the abnormal state based on the pressure characteristic from the operation starting time of the air cylinder to the operation starting time of the cutoff valve, and (3) the cutoff valve as being in the normal state or the abnormal state based on the pressure characteristic measured after the operation starting time of the cutoff valve.

3. The cutoff valve control apparatus as claimed in claim 2, wherein the judging device judges the cutoff valve as being in the normal state and the air cylinder as being in the abnormal state when the pressure characteristic measured after the operation starting time of the cutoff valve is outside the area between the pressure characteristic of the normal operation and the pressure characteristic of the failure prediction boundary, and has a gradient that is the same as that of the pressure characteristic of the normal operation measured after the operation starting time of the cutoff valve.

4. The cutoff valve control apparatus as claimed in claim 1, further comprising a display device for displaying the measured pressure characteristic, the pressure characteristic of the initial normal operation and the pressure characteristic of the failure prediction boundary stored in the memory device of the cutoff valve control apparatus.

5. A cutoff valve control apparatus comprising:
a cutoff valve;
a control device including an air cylinder for controlling rotation of a valve axle of the cutoff valve and a solenoid valve for supplying air from an air supply source to the air cylinder and exhausting the air from the air cylinder to control the degree of opening of the cutoff valve;
a displacement detection device for detecting a displacement of the valve axle of the cutoff valve;
a judging device for judging a normal state or an abnormal state of the cutoff valve control apparatus based on a displacement characteristic measured with the displacement detection device when the air from the air supply source is supplied to the air cylinder under control of the control device;
a memory device for storing beforehand the displacement characteristic of an initial normal operation and the displacement characteristic of a failure prediction boundary of the cutoff valve control apparatus, both displacement characteristics showing lines, if graphed with respect to time,
wherein the respective lines are recorded during, in order, an operation starting time t1 of the solenoid valve, an operation starting time t2 of the air cylinder, an operation starting time t3 of the cutoff valve, and a fully opened time t4 of the cutoff valve, the gradients of the lines between t1-t2 are zero for both displacement characteristics, the gradient of the line between t2-t3 is higher than gradient of the line between t3-t4 for the initial normal operation, and the gradients of the lines between t2-t4 of the failure prediction boundary are lower than the gradients of the initial normal operation,
wherein the judging device judges (1) the cutoff valve control apparatus as being in the normal state when the measured displacement characteristic is in an area between the displacement characteristic of the normal operation and the displacement characteristic of the failure prediction boundary, and (2) the cutoff valve control apparatus as being in the abnormal state when the measured displacement characteristic is outside the area between the displacement characteristic of the normal operation and the displacement characteristic of the failure prediction boundary.

6. The cutoff valve control apparatus as claimed in claim 5, further comprising a display device for displaying the measured displacement characteristic, the displacement characteristic of the initial normal operation and the displacement characteristic of the failure prediction boundary stored in the memory device of the cutoff valve control apparatus.

* * * * *